(12) United States Patent
Pikus

(10) Patent No.: US 6,767,520 B2
(45) Date of Patent: Jul. 27, 2004

(54) COOLING SYSTEM FOR POLYMER PROCESSING

(75) Inventor: Ilya Pikus, Plymouth, MN (US)

(73) Assignee: Hosokawa Bepex Corporation, Minneapolis, MN (US)

( * ) Notice: Subject to any disclaimer, the term of this patent is extended or adjusted under 35 U.S.C. 154(b) by 533 days.

(21) Appl. No.: 09/934,798

(22) Filed: Aug. 22, 2001

(65) Prior Publication Data

US 2003/0039594 A1 Feb. 27, 2003

(51) Int. Cl.⁷ .............................................. B01D 9/00
(52) U.S. Cl. ................................. 422/245.1; 422/251
(58) Field of Search ....................... 422/245.1, 250.1, 422/251–254; 117/206; 23/295 R; 528/503, 308.3, 308.5, 502 E

(56) References Cited

U.S. PATENT DOCUMENTS

| | | | |
|---|---|---|---|
| 4,161,578 A | * | 7/1979 | Herron ..................... 528/308.5 |
| 4,481,069 A | * | 11/1984 | Chai et al. .................... 117/71 |
| 4,591,632 A | * | 5/1986 | Moore ......................... 528/481 |
| 5,410,984 A | | 5/1995 | Pikus et al. |
| 5,440,005 A | | 8/1995 | Pikus |
| 5,454,344 A | | 10/1995 | Pikus et al. |
| 5,497,562 A | | 3/1996 | Pikus |
| 5,516,880 A | | 5/1996 | Walsh |
| 5,662,870 A | | 9/1997 | Walsh |
| 5,711,089 A | | 1/1998 | Pikus |
| 5,839,207 A | * | 11/1998 | Christensen et al. .......... 34/369 |
| 6,111,034 A | * | 8/2000 | Goode et al. .................. 526/59 |
| 6,599,596 B2 | * | 7/2003 | Nichols et al. ............. 428/35.7 |

* cited by examiner

Primary Examiner—Kiley Stoner
Assistant Examiner—Kevin McHenry
(74) Attorney, Agent, or Firm—Piper Rudnick LLP

(57) ABSTRACT

A system for the solid phase polymerization of polymers wherein cold amorphous polymer is introduced to one or more crystallizers and heated to crystallize the polymer. The crystallized polymer is discharged to a reactor for polymerization of the polymer, and the hot polymer product of the reactor is discharged to a fluid bed cooler. The fluid bed cooler includes an inlet for the hot polymer and inlets for the gas used for agitating the polymer. Outlets for the polymer and for the off-gas are also provided. At least one spray nozzle is located in the cooler at a position adjacent the upper level of the polymer and water is introduced through the nozzle for contact with the polymer to achieve cooling of the polymer as a result of the vaporization of the water.

13 Claims, 4 Drawing Sheets

COOLING SYSTEM FOR POLYMER PROCESSING

BACKGROUND OF THE INVENTION

This invention relates to polymer processing systems which treat amorphous polyester to achieve crystallization, followed by solid phase polymerization followed by cooling. An example of such a system is found in Walsh U.S. Pat. No. 5,516,880.

In systems of the type contemplated by this invention, cold amorphous polymer material is fed to a crystallizer and, after substantial heat input, hot product is discharged. The particular apparatus for achieving the crystallization may comprise an indirect heat supply unit or a fluid bed. The Solidaire® or TorusDisc® equipment manufactured by Hosokawa Bepex of Minneapolis, Minn. are examples of an indirect heat supply unit which may be utilized for achieving the crystallization. In such a system, steam or other heated fluid is passed through rotors and/or jackets which are in contact with the agitated polymer material. The polymer is thereby heated to the necessary temperature for achieving the crystallization reaction.

In a fluid bed system, for example units manufactured by Howokawa Bepex, heated air is brought into contact with the polymer material in order to improve heat transfer and to achieve the temperatures required for the crystallization reaction.

In systems of the type described, the crystallized material is discharged in the post crystallizer/preheater to further heat the crystallized material to the polymerization reaction temperature and then preheated polymer is transferred to a reactor for achieving polymerization. Subsequent to the polymerization, the material is transferred to a cooler which may also comprise, for example, a TorusDisc® or fluid bed system. Where a fluid bed cooler is employed, it has been the practice to achieve the cooling, at least in part, by contacting the hot material with cool gas which may be air or some other gas such as nitrogen. As a result, the gas is heated considerably and may then be recirculated only if first cooled. The expense of gas recirculation and cooling is, however, only warranted where nitrogen or some other more expensive gas is being used.

SUMMARY OF THE INVENTION

This invention provides a system for polymer processing wherein greatly improved efficiencies are achieved in the operation of the cooling portion of the cycle. In particular, the system constitutes a process and apparatus for utilization of water spray cooling in a fluid bed cooling operation which greatly improves the efficiency of this operation.

The system of the invention comprises, in particular, an arrangement wherein solid phase polymerization is achieved by introducing cold amorphous polymer to a crystallizer to crystallize the polymer. The crystallized polymer is then heated to the required polymerization reaction temperature in the post crystallizer/preheater and then discharged to a reactor for annealing to achieve polymerization of the polymer. As a preferred form of the invention, dry and cool gas is introduced in a transition zone at the bottom of the reactor.

The polymer product of the reactor is discharged to a fluid bed cooler for cooling of the polymerized product. The fluid bed cooler includes an inlet for the hot polymer and an inlet for the cooling gas to provide for contact of the gas with the polymer. The cooler includes a bed portion in which the polymer moves while in contact with the cooling gas, and an upper chamber which collects the off-gas. The temperature of the polymer gradually decreases from the location of the inlet for the polymer to the location of the discharge for the polymer.

The fluid bed cooler of the present invention includes one or up to several water spray nozzles located just above or below the fluidized bed level of the polymer. The number of spray nozzles used depends generally on the size of the system involved with this fluid bed spray cooler system, the bulk of the cooling can be done by vaporization of water and, due to the high heat transfer rate of direct water vaporization, the size of the cooler can be reduced to a great extent. Accordingly, the flow rate of the fluidizing cooling gas required is considerably lower than in the regular gas-cooled fluid bed cooler, and substantial energy savings can be obtained.

The water spray cooling can be utilized in an open-loop-one-pass-gas fluid bed cooler as well as in the closed loop cooling operations where recirculation of fluidizing cooling gas is provided. In the closed loop cooler a gas-cooling-heat exchanger/condenser can be employed and the condensed water can be delivered back to the spray nozzles.

DETAILED DESCRIPTION OF THE PREFERRED EMBODIMENTS

Figure 1:
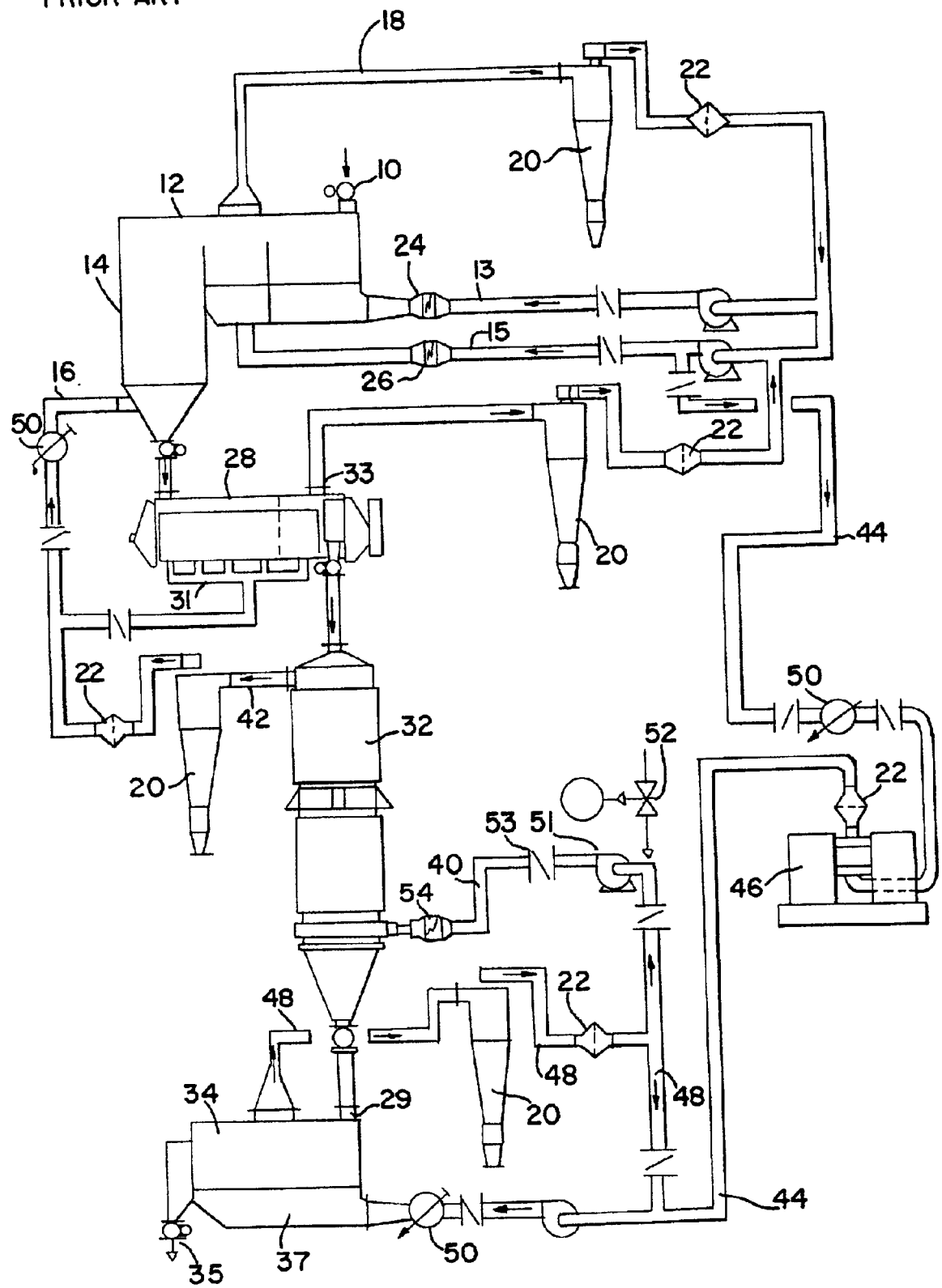
FIG. 1 is a schematic illustration of a prior art system for solid phase polymerization wherein a fluid bed cooler is employed.

A prior art polymer processing system is shown in FIG. 1 for purposes of illustrating an environment in which the invention may be practiced. This system comprises a feed inlet 10 for receiving cold amorphous polymer material and for delivering the material to fluid bed crystallizer 12. Hot gases are introduced through conduits 13 and 15 to achieve heating and agitation of the polymer while the polymer is being moved from the input end to the output end of the crystallizer.

The fluid bed unit 12 is preferably of the type manufactured by Hosokawa Bepex Corporation. Air or other gas is introduced into the unit 12 for achieving fluidization and heating of the polymer and this results in agitation and progression of the polymer through the unit from the entry end to the discharge end. The agitation achieved by the fluidizing operation insures heat transfer to the polymer product whereby the product will be heated to the desired temperature for crystallization.

Stripper column 14 receives the crystallized material from the output end of the crystallizer 12. In conventional fashion, hot air, nitrogen, or other gasses are introduced to the hopper/dryer through conduit 16. These gases, as well as the hot gases from the crystallizer 12 are passed through conduit 18 to conventional cleaning and filter equipment 20 and 22, (and also used in other parts of the system) whereby the gases may be recirculated after passing through heaters 24 and 26 positioned at the ends of conduits 13 and 15. The unit 20 may comprise a cyclone separator and the unit 22, a swing cartridge filter.

Preheater/post crystallizer/annealer unit 28 is positioned at the outlet of the stripper column 14. This preferably comprises a TorusDisc® or Thermascrew® unit of the type manufactured by Hosokawa Bepex Corporation. Such units serve to further heat the crystallized material while agitating the material to achieve post-crystallization and annealing of the polymer product. The TorusDisc® unit, for example, consists of a stationary horizontal vessel containing a tubular rotor with vertically-mounted double-walled discs. These discs provide approximately 85% of the total heating surface. Other heating surfaces are the rotor shaft and the inner wall of the jacketed vessel trough. As a consideration of literature illustrating the product will reveal, inlet 31 and outlet 33 are provided so that hot gases are adapted to be circulated through the unit. These gases are also adapted to be recirculated to the fluid bed crystallizer 12.

Material is delivered from the unit 28 and to hopper/reactor 32 where the solid phase polymerization takes place in a conventional fashion. Material exiting from the hopper/reactor is then delivered to the inlet 29 of fluid bed cooler 34 and, after cooling, is discharged from the outlet 35.

In the prior art system shown in FIG. 1, hot gases are introduced to the reactor 32 from the conduit 40 and the gases exit through the conduit 42. After cleaning, the gases, which still retain substantial heat, are fed to the stripper column 14 and the unit 28. Some of the gas from the line 15, prior to reaching the heater 26, is fed through the conduit 44 to the fluid bed cooler. A dehumidifier 46 is interposed in the conduit 44, and a plenum chamber 37 of the cooler 34 receives the gas from the conduit 44.

In a typical prior art operation, the gas entering the fluid bed cooler 34 is at 110° F. and the gas in the conduit 48 exiting from the cooler is 195° F. As illustrated, the gas entering the fluid bed cooler comprises a combination of gas from conduit 44 and conduit 48, and since the latter gas is initially too hot, some cooling must be achieved. This can be done only by insuring that the gas in conduit 44 is sufficiently cool to bring the temperature of the gas from conduit 48 down sufficiently, or cooling means 50 must be employed to cool the combination before entry into the cooler 34.

The example of a prior art system shown also stipulates the condition for gas entering the reactor 32 through the conduit 40 at a temperature of 410° F. This gas consists of recirculated gas from conduit 48 and make up gas from inlet 52. To achieve the indicated temperature level, the gas is heated by means of heater 54 before entering the reactor 32 from the conduit 40. Blower 51 and damper 53 are used for controlling the gas flow in line 40.

In a typical system according to the prior art operation, 110,000 pounds per hour of gas at 110° F. are fed to fluid bed cooler 34 and an essentially equal amount exits from the cooler at 195° F. The reactor 32 requires an input of 20,700 pounds per hour and the balance of the gas exiting from cooler 34 into conduit 48 (89,300 pounds per hour) is supplemented by 20,700 pounds per hour of gas at 110° F. from conduit 44.

Surprisingly, it has been found that there is no need to preheat the dry gas introduced to the reactor. This gas (as a general rule, dry nitrogen) is used for stripping from the polymer and removal from the reactor the gaseous by-products of the polymerization reaction. In order to provide the optimal processing conditions and conduct the solid state polymerization in a conventional fashion the crystallized polymer is heated to the optimal polymerization temperature required in the preheater/post crystallizer/annealer unit 28. Moreover, it has been determined that at the optimal gas-to-solids ratio in the reactor (which for a typical system is in the range of 0.3–0.4), the relatively cold gas (at 110° F.) introduced to the bottom of reactor and purged through the moving bed of the hot polymer in the countercurrent flow, is quickly heated to the product temperature in the reactor. Due to a high heat transfer rate between purged gas and solids in the compacted bed of polymer granules, the height of this heat exchange transition zone in the typical reactor does not exceed 1–1.5 feet, while the total height of the moving polymer bed in a typical reactor is 50–60 feet. Therefore, introduction of an unheated dry gas to the reactor requires an only insignificant increase in the reactor size while at the same time enabling the beginning of the polymer cooling process in the bottom part of the reactor immediately before discharging the polymerized polymer into the fluid bed cooler. It has been determined that at the indicated typical gas-to-solids ratio in the reactor of 0.35 and at the unheated gas temperature of 110° F. the polymer temperature in the named transition zone in the bottom part of the reactor is reduced from the typical polymerization temperature level of 410° F. down to 340° F. at the discharge from the reactor.

Completion of the cooling process to the typical required final polymer temperature of 120° F. is accomplished in the fluid bed spray cooler of the present invention. As indicated, this is preferably accomplished in combination with the utilization of unheated gas introduced to the reactor which makes it possible to simplify the processing system (eliminating some components such as a gas heater, recirculating conduits, dampers, etc.) and thereby considerably reduce the capital and operating cost. In addition, this concept allows the use of air (instead of expensive nitrogen) as a cooling medium in the polymer cooler. Also, there is not any strict limitation regarding the humidity of a cooling gas (nitrogen) in the cooler as is required in a conventional system due to partial recirculation of the off-gas from the cooler to the reactor as described in operation of FIG. 1. And the marginal energy savings which can be achieved as a result of the partial heat recover from the off-gas in the conventional system are definitely lower than the reduction in equipment cost and operating savings which can be obtained by using the system of the present invention.

Figure 2:
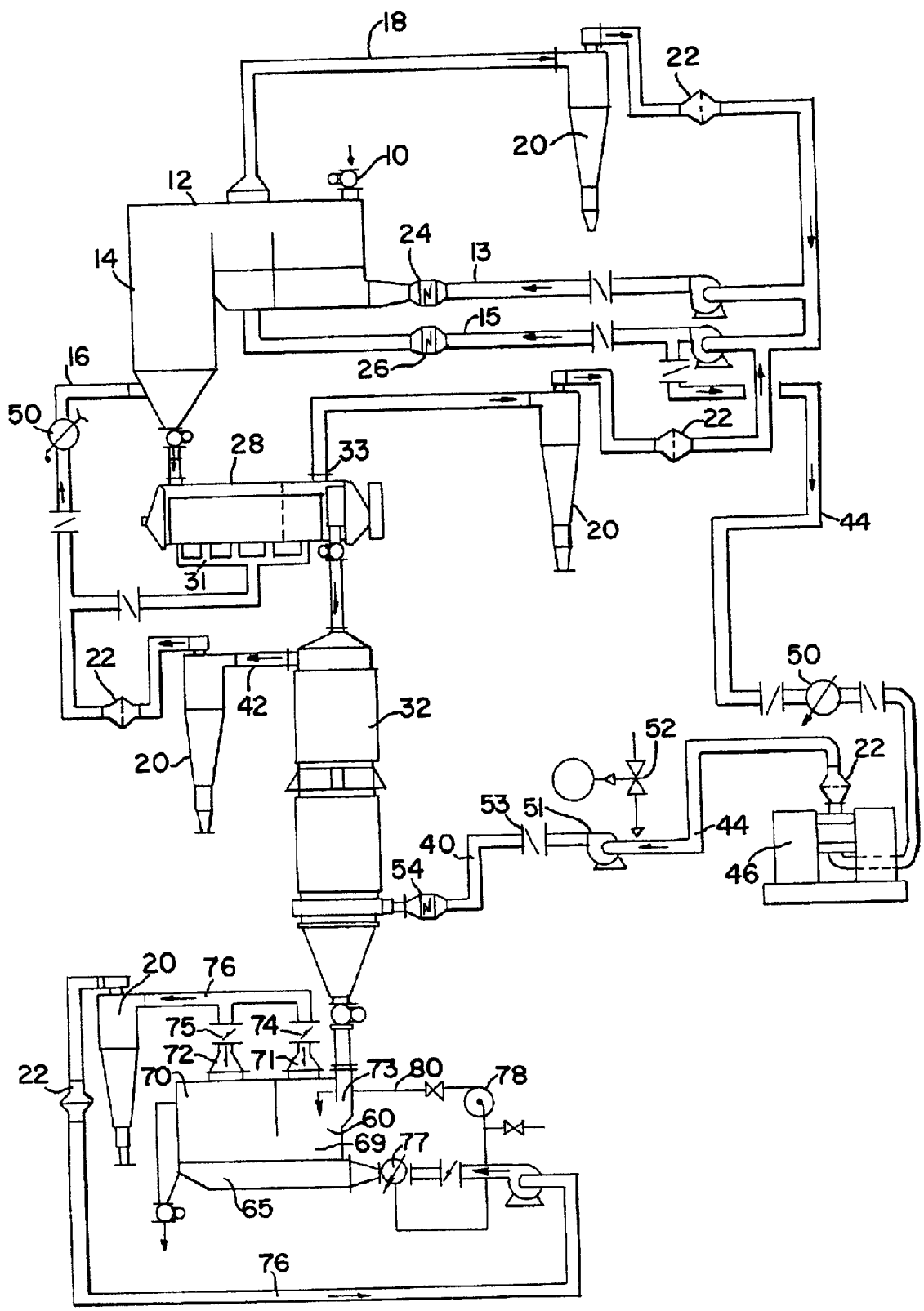
FIG. 2 is a schematic illustration of a system for solid phase polymerization wherein the fluid bed cooler is characterized by the features of this invention.

FIG. 2 illustrates a system of one type suitable for the practice of the invention, which is generally comparable to that of FIG. 1 from the standpoint of the crystallizer 12, unit 28 and reactor 32. The system differs with respect to the gas supply to the reactor 32, as well as to the structure and operation of the fluid bed cooler 60 used in the system.

Regarding the gas supply to the reactor, as already noted, this is achieved by providing a slight longer reactor to form a transition zone adjacent the input 55 for the dry and cool gas.

Figure 3:
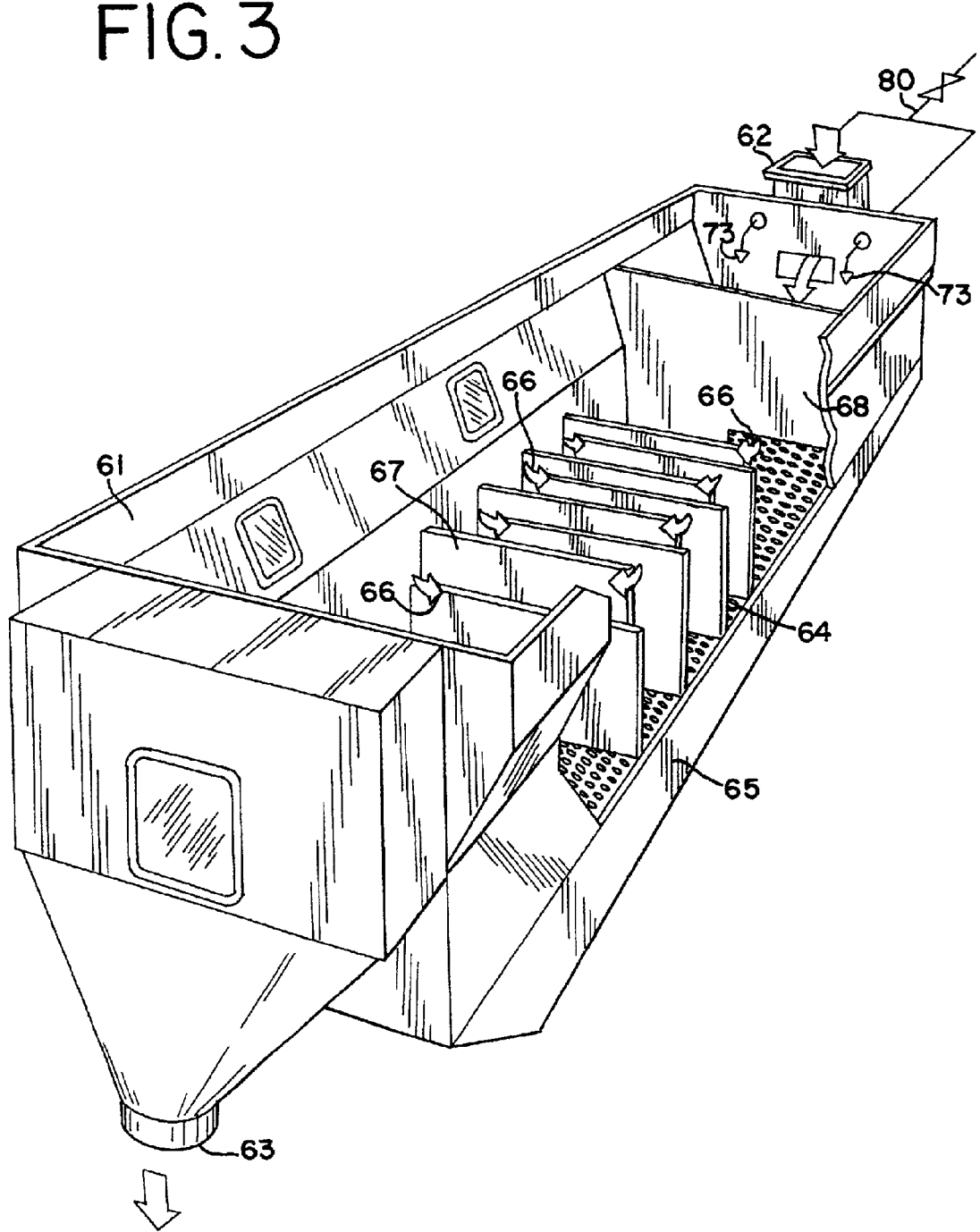
FIG. 3 is a perspective view of a fluid bed cooler suitable for use in the practice of the invention.
Figure 4:
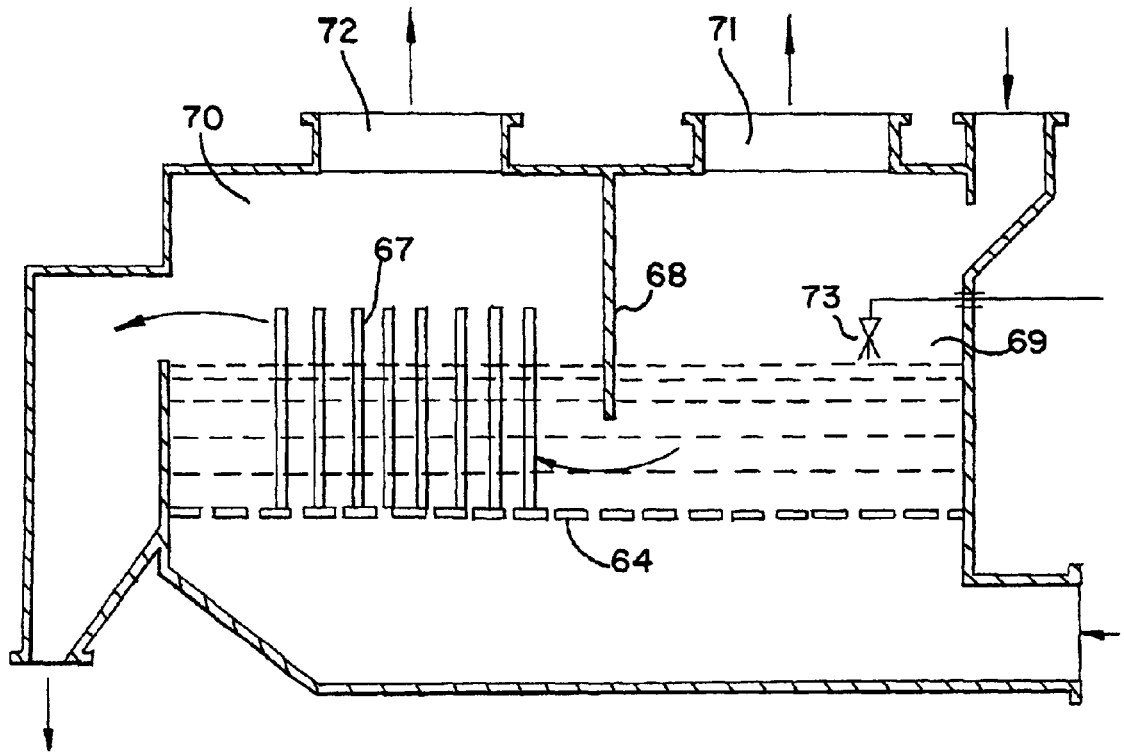
FIG. 4 is a schematic side elevational view of a fluid bed cooler of the type employed in the practice of the invention.

The fluid bed cooler 60 of the invention is shown in greater detail in FIGS. 3 and 4, and comprises a housing 61 defining inlet 62 and outlet 63 for the polymer being treated. The polymer is moved over the perforated screen or bubble cap-type gas distributor 64 and cool gas is delivered from plenum 65 through the perforations for contact with the hot polymer whereby the polymer is agitated and cooled as it passes through the cooler.

As is illustrated by arrows 66, the polymer is typically directed around baffle plates 67 to minimize short circuitry and backflow of solids and maximize opportunity for uniform exposure of all of the polymer granules to the cooling gas. In addition, an underflow weir 68 as described in the aforementioned U.S. Pat. No. 5,516,880 is provided for dividing the cooler housing into separate chambers 69 and 70.

The underflow weir 68 is extended to the top of the cooler. Separate gas exhausts 71 and 72 are provided for chambers 69 and 70, and the weir therefore operates to prevent overflow of the fluidized polymer granules from chamber 69 into chamber 70 as well as to minimize an exposure of solids in chamber 70 to the gas atmosphere in chamber 69.

In accordance with this invention, one or several water spray nozzles 73 are provided in chamber 69. These may be located above or below the fluidized bed top level of the polymer, preferable in the near vicinity of that level. The system of the invention utilizes the effect of spray cooling and the excellent heat transfer rate of direct water vaporization on the highly developed heat and mass transfer surface area of the hot polymer granules in a vigorously agitated fluidized bed. The bed temperature in chamber 69 is maintained at about 230° F. or higher to prevent solids overwetting and defluidization. In order to maintain a well agitated bed in this chamber, the fluidizing air velocity can be higher than in the relatively "dry" chamber 70 and must be maintained at several times the minimum fluidization velocity for a given polymer. The corresponding cooling gas flow rate distribution between chambers 69 and 70 can be controlled using dampers 74 and 75 which are provided in the separate gas exhausts 71 and 72.

Figure 5:
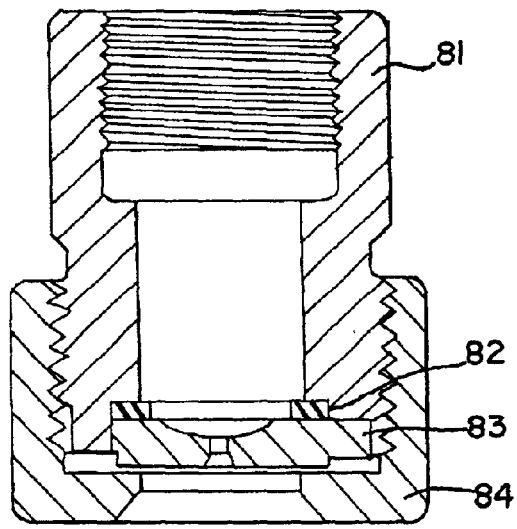
FIG. 5 is a cross-sectional view of a spray nozzle of the type suitable for use in the practice of the invention.

FIG. 5 illustrates an example of a suitable spray nozzle for use in the practice of the invention. This nozzle comprises a Unijet® manufactured by Spraying System Co. and it consists of nozzle body 81 for attachment to a fluid delivery line, seal disc 82, spray tip 83 with a spray opening, and tip retainer 84.

The nozzles are located just above or below the fluid bed level (2 to 5 in.) in order to prevent a carryover of the atomized water with the off gas (if nozzles are located too high) or to prevent "local" overwetting and caking of polymer particles in the bed (if nozzles are located too low under the bed level).

The layout of the nozzles in the fluid bed chamber 69 should be of such a pattern as to prevent possible overlapping of the spray cones from the adjacent nozzles as well as to prevent wetting of the chamber walls. Depending upon the flow rate of the cooling water, the number of nozzles used, and the height of the fluid bed, the spacing between the nozzles can be in the order of 8 to 20 in. The pressure of water supplied to the nozzles should be 3 to 100 psi preferably 5 to 30 psi.

As illustrated, the bottom edge of weir 68 is spaced from the perforated gas distributor 64 to permit underflow passage of polymer from chamber 69 to chamber 70, where the final process of drying and cooling of the polymer is taking place. The underflow weir 68, extended to the top of the cooler, prevents short-circuiting of the wetted polymer granules from the upper part of fluid bed spray cooling chamber 69 into the post drying cooling chamber 70. In accordance with this invention, the separate gas exhausts 71 and 72 prevent exposure of solids in the dry cooling chamber 70 to the moist gas atmosphere exhausted from the "wet" chamber 69, thereby improving the drying performance of the cooling operation and ensuring the required uniform final moisture content and temperature of the polymer granules.

In an open-loop-one-pass-gas spray fluid bed cooling operation, the off-gas from chambers 69 and 70 can be exhausted into the plant aspiration system. When a closed loop cooling operation is preferred (using nitrogen or more expensive gas as a cooling medium), the combined flow of the off-gas from chambers 69 and 70 is delivered through conduit 76 for return into the fluid bed cooler. This gas is passed through cooling means 77 to achieve the desired temperature level and humidity of the cooling gas flow. Condensate, collected in the gas cooler/condenser 77, can be recirculated to the spray nozzles 73 using a pump 78 and pipe-line 80.

In FIG. 2, there is shown a gas heater 54 which is utilized basically for starting of the hopper reactor 32. After the starting period when the system begins to operate in a steady mode and cooling gas is introduced, heater 54 can be turned off or can be utilized only for an additional, more accurate temperature control in the reactor at a relatively low power consumption.

In addition to the aforementioned improvements achieved using the cooling gas introduction in the transition zone of the reactor, the invention achieves improvements since, for example, because of the water spray cooling effect, the flow rate of cooling gas can be reduced by 45% and only 60,500 lbs per hour of cooling gas at 100 deg F. is needed to operate the fluid bed cooler. Accordingly, the size of the cooler and all associated equipment such as the cooling blower, cyclone 20, filter 22, dampers and ductwork can be reduced by approximately 43% (taking into consideration the additional volume of water vapor introduced into the system because of evaporation of cooling water). As a result, this constitutes approximately a 40% reduction in the cooling blower power consumption when compared with the conventional system described. The system according to the present invention also allows for the use of air instead of expensive nitrogen as a cooling medium in the polymer cooler with considerable additional reduction of the capital and operating cost.

That which is claimed is:

1. A system for the solid phase polymerization of polymers wherein cold amorphous polymer is introduced to one or more crystallizers and heated to crystallize the polymer, the crystallized polymer is discharged to a reactor for polymerization of the polymer, and the hot polymer product of the reactor is discharged to a fluid bed cooler for cooling of the polymerized product, said fluid bed cooler including an inlet for the hot polymer and an inlet for gas used for agitating the fluid bed, and means for discharging the cooled polymer and the off-gas from the cooler after contact of the gas with the polymer, and including at least one spray nozzle located in said cooler at a position adjacent the upper level of the polymer in the cooler, and means for introducing water through said nozzle and into said cooler for contact of the water with the polymer to achieve cooling of the polymer as a result of the vaporization of the water.

2. A system according to claim 1 wherein said inlet for the hot polymer is located at one end of the cooler, said at least one spray nozzle and a means for discharging the off-gas being positioned in the vicinity of said one end of the cooler, said means for discharging the cooled polymer being positioned at the opposite end of said cooler.

3. A system according to claim 2 wherein said cooler includes an upper chamber in which off-gas is collected, the moisture content of the polymer and the humidity of the off-gas being higher in the area of said chamber located adjacent said one end of said cooler and then gradually decreasing toward the opposite end of said cooler, an underflow weir provided for dividing the fluid bed cooler and said upper chamber into separate zones, and at least two off-gas outlets defined by said upper chamber to serve as said means for discharging the off-gas, one of said at least two outlets communicating with the area of said chamber located adjacent said one end of said cooler whereby the off-gas with higher humidity can be discharged therethrough, said weir dividing said area from the remainder of said chamber whereby the polymer adjacent said opposite end of the cooler is not exposed to the higher humidity environment.

4. A system according to claim 3 including a separate zone in said cooler into which the polymer moves after passing said underflow weir, the temperature of the polymer and the moisture content of the polymer gradually decreasing as the polymer approaches said opposite end of the cooler, a second of said at least two off-gas outlets communicating with said separate zone whereby off-gas having a lower humidity is discharged therethrough.

5. A system according to claim 4 wherein each of the said off-gas discharge means is provided with individual off-gas flow rate control means whereby control of a fluidization velocity of the cooling gas in the said separate cooler zones as well as control of gas flow rate distributions between said zones can be achieved.

6. A system according to claim 1 wherein at least two spray nozzles, located in side-by-side relationship, are positioned in the cooler.

7. A system according to claim 1 wherein said at least one spray nozzle is located at a position between 5 inches above said upper level and 5 inches below said upper level.

8. A system according to claim 1 wherein said at least one spray nozzle is located 2 to 5 inches above said upper level.

9. A system according to claim 1 wherein said at least one spray nozzle is located 2 to 5 inches below said upper level.

10. A system according to claim 1 wherein the gas introduced for agitating the fluid bed undergoes heat exchange with the polymer whereby drying and some cooling of the polymer is achieved by means of the gas, said gas being introduced into the cooler at several times the minimum fluidization velocity for the polymer and at a total flow rate required for achieving drying and cooling of the product.

11. A system according to claim 1 wherein the gas introduced for agitating the fluid bed is air.

12. A system according to claim 1 wherein a transition zone is provided at the lower end of said reactor, and means for introducing cooling gas into said transition zone for lowering the temperature of the polymer prior to discharge of the polymer into the fluid bed cooler.

13. A system according to claim 1 wherein said cooling gas is nitrogen.

* * * * *